USo09187327B2

(12) United States Patent
Davis et al.

(10) Patent No.: US 9,187,327 B2
(45) Date of Patent: Nov. 17, 2015

(54) PHOSPHORIC ACID PRODUCTION GYPSUM FILTRATION FLOCCULANT PRE-DILUTION (MAKE DOWN) WITH POST-FILTRATION PHOSPHORIC ACID

(75) Inventors: Ronald V. Davis, Geneva, IL (US); Wayne L. Moss, Chapin, SC (US); Michael G. Strominger, Naperville, IL (US); Randon Renzello, Chubbuck, ID (US); Thomas A. Faigl, Rock Springs, WY (US); Daniel N. T. Hay, Naperville, IL (US)

(73) Assignee: Nalco Company, Naperville, IL (US)

( * ) Notice: Subject to any disclaimer, the term of this patent is extended or adjusted under 35 U.S.C. 154(b) by 379 days.

(21) Appl. No.: 12/984,331

(22) Filed: Jan. 4, 2011

(65) Prior Publication Data
US 2012/0171099 A1   Jul. 5, 2012

(51) Int. Cl.
*C01B 25/235* (2006.01)
*C01B 25/22* (2006.01)
*C01B 25/18* (2006.01)
*B01D 21/01* (2006.01)
*B01D 21/08* (2006.01)

(52) U.S. Cl.
CPC ............... *C01B 25/235* (2013.01); *C01B 25/22* (2013.01); *B01D 21/01* (2013.01); *B01D 21/08* (2013.01); *C01B 25/18* (2013.01)

(58) Field of Classification Search
CPC ............... C01B 25/18–25/238; C01B 25/468
USPC .............. 423/299, 316, 317, 319, 320, 321.1, 423/321.2
See application file for complete search history.

(56) References Cited

U.S. PATENT DOCUMENTS

| 3,624,019 | A |   | 11/1971 | Anderson |
| 3,694,153 | A | * | 9/1972 | Williams et al. ........... 423/321.1 |
| 3,829,389 | A |   | 8/1974 | Veronica et al. |
| 4,160,657 | A |   | 7/1979 | Drechsel |
| 4,191,655 | A |   | 3/1980 | Quinn et al. |
| 4,251,363 | A |   | 2/1981 | Chamberlain et al. |
| 4,263,148 | A | * | 4/1981 | Symens et al. ................ 210/705 |
| 4,291,005 | A |   | 9/1981 | Poulos et al. |
| 4,332,779 | A |   | 6/1982 | Thibodeau et al. |

(Continued)

FOREIGN PATENT DOCUMENTS

| FR | 1336816 A | 9/1963 |
| FR | 2405897 A1 | 5/1979 |

(Continued)

OTHER PUBLICATIONS

Deo, Puspendu et al.; Conformational Changes of Pyrene-Labeled Polyelectrolytes with pH: Effect of Hydrophobic Modifications; J. Physical Chem. B 2005, vol. 109; pp. 20714-20718.

(Continued)

*Primary Examiner* — Anthony J Zimmer
*Assistant Examiner* — Justin Bova
(74) *Attorney, Agent, or Firm* — Leydig, Voit & Mayer, Ltd.

(57) ABSTRACT

A method for minimizing the addition of water to a phosphoric acid production process is described. The method uses phosphoric acid to make down a flocculant that is added to the process in order to promote filtration or clarification of crude phosphoric acid. Preferably, the phosphoric acid is a crude, clarified phosphoric acid that is recycled from the phosphoric acid production process itself.

10 Claims, 4 Drawing Sheets

(56) References Cited

U.S. PATENT DOCUMENTS

| | | | |
|---|---|---|---|
| 4,369,169 A * | 1/1983 | Nineuil et al. | 423/321.1 |
| 4,581,156 A | 4/1986 | Chatham | |
| 4,599,390 A | 7/1986 | Fan et al. | |
| 4,743,438 A | 5/1988 | Kennedy et al. | |
| 4,745,154 A | 5/1988 | Ruffner | |
| 4,797,265 A * | 1/1989 | Inoue et al. | 423/320 |
| 4,800,071 A * | 1/1989 | Kaesler et al. | 423/321.1 |
| 5,009,873 A * | 4/1991 | Kerr et al. | 423/320 |
| 5,120,519 A * | 6/1992 | Gross | 423/321.1 |
| 5,173,280 A | 12/1992 | Rey et al. | |
| 5,183,211 A | 2/1993 | Malito et al. | |
| 5,185,135 A * | 2/1993 | Pillai et al. | 423/320 |
| 5,211,928 A | 5/1993 | Rey et al. | |
| 5,318,707 A * | 6/1994 | Rey et al. | 210/734 |
| 5,548,020 A | 8/1996 | Santini et al. | |
| 5,571,862 A | 11/1996 | Santini et al. | |
| 6,489,651 B1 | 12/2002 | Kim | |
| 2002/0190005 A1 * | 12/2002 | Branning | 210/702 |
| 2010/0170856 A1 | 7/2010 | Branning | |

FOREIGN PATENT DOCUMENTS

| | | |
|---|---|---|
| GB | 1020015 A | 2/1966 |
| JP | 58-185671 A | 10/1983 |
| WO | WO 2010/045523 A1 | 4/2010 |

OTHER PUBLICATIONS

European Patent Office, Extended European Search Report in European Patent Application No. 12732297.2, May 28, 2015, 7 pp.

* cited by examiner

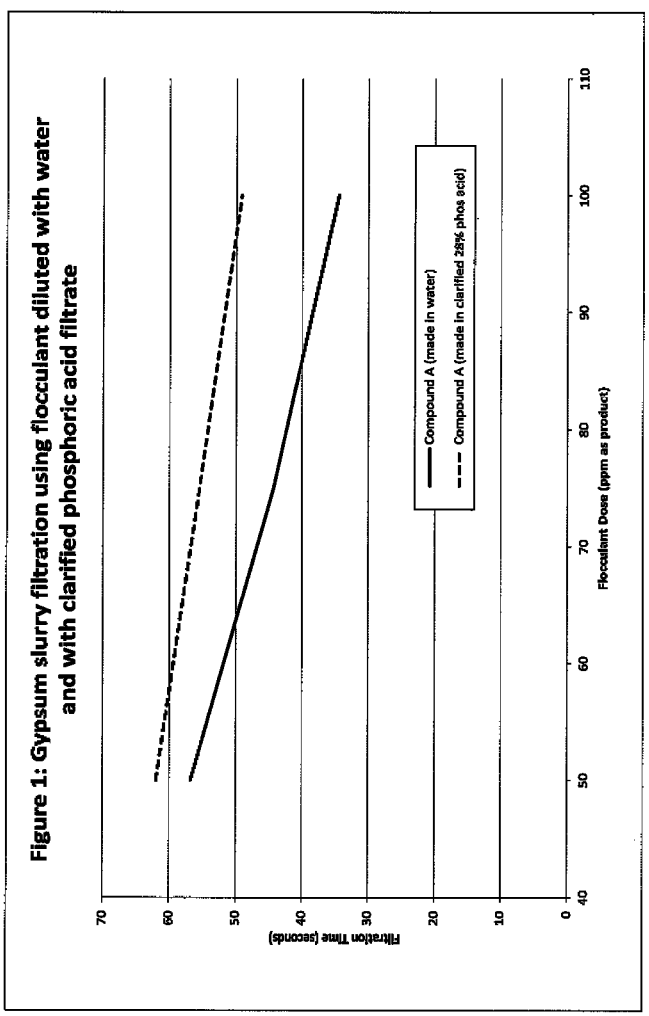

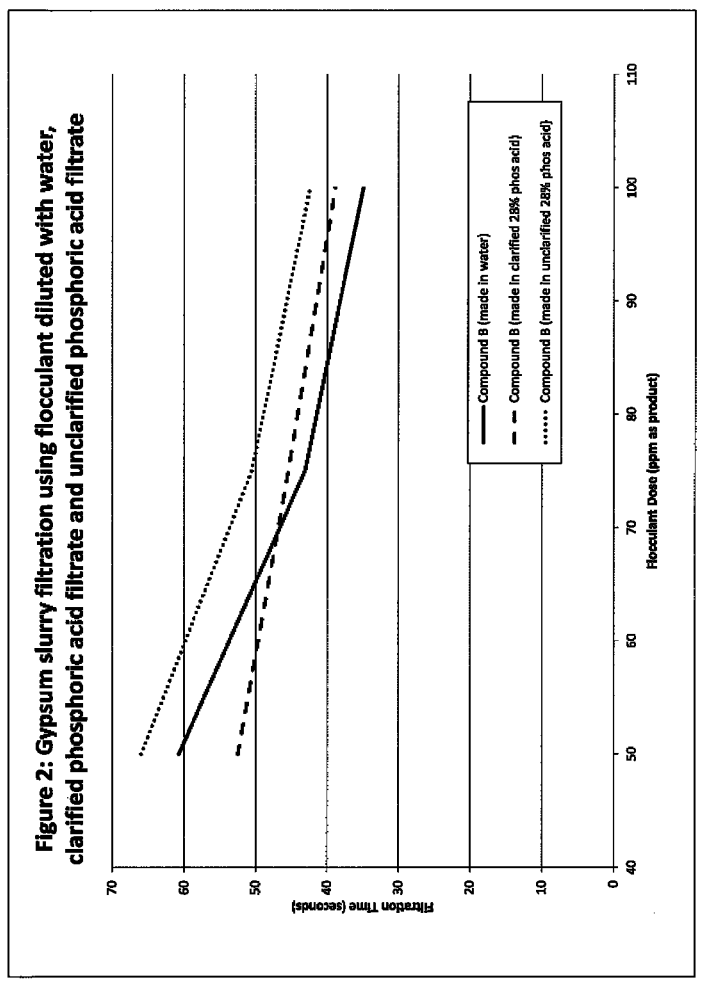

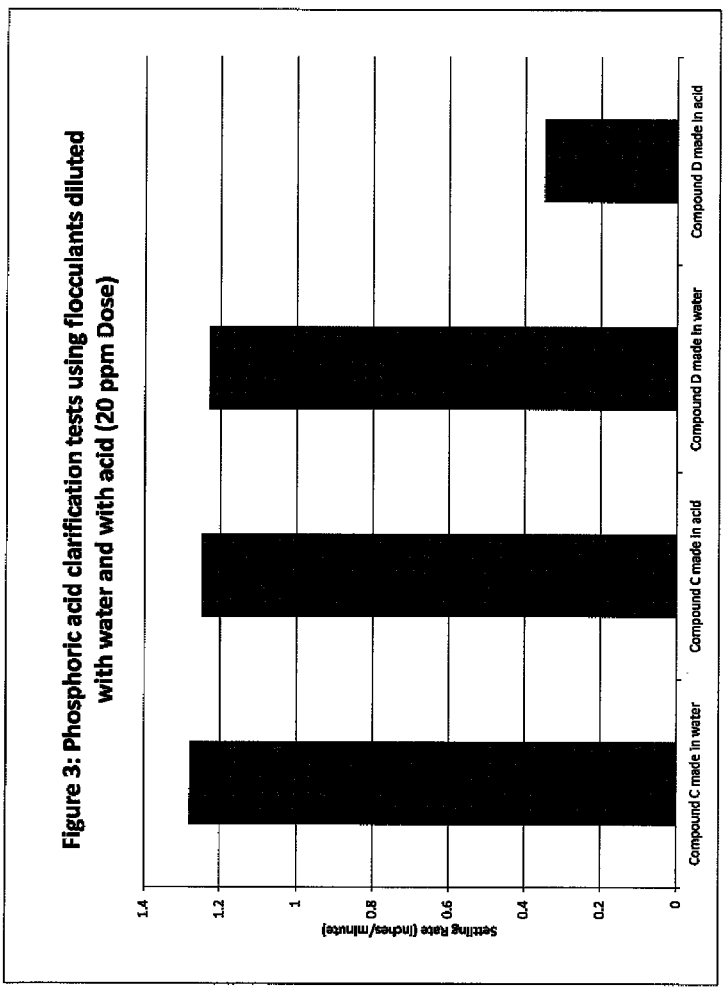

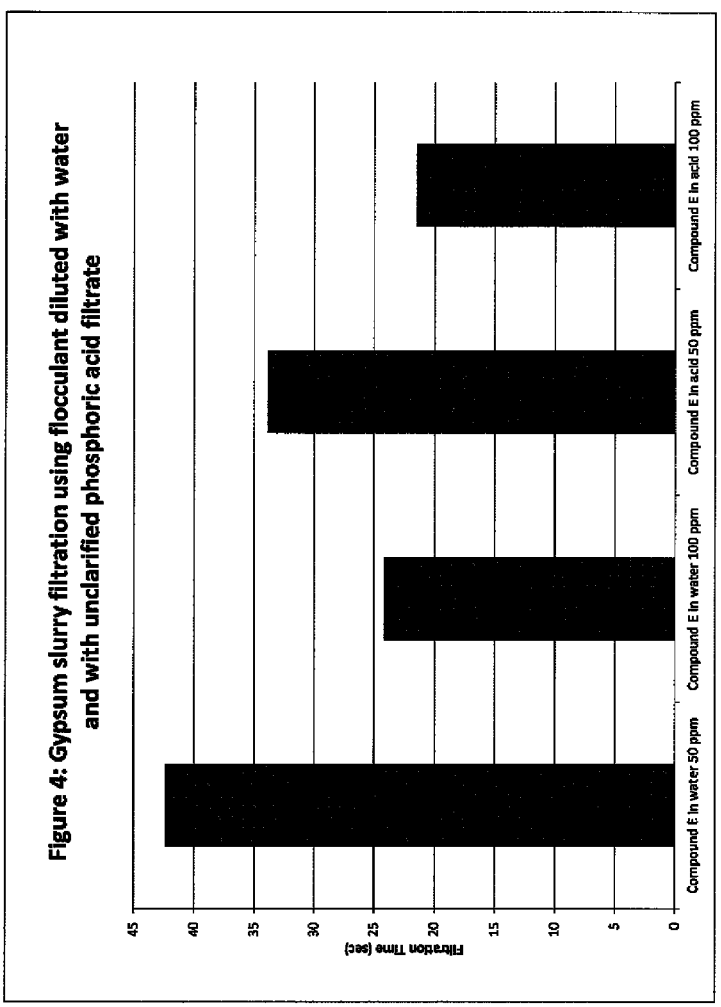

PHOSPHORIC ACID PRODUCTION GYPSUM FILTRATION FLOCCULANT PRE-DILUTION (MAKE DOWN) WITH POST-FILTRATION PHOSPHORIC ACID

FIELD OF THE INVENTION

The present invention is in the technical field of the wet process production of phosphoric acid and additives therefor, and in particular the present invention is a method to make down additives using crude phosphoric acid filtrate as the diluent.

BACKGROUND

Phosphoric acid is generally produced by the digestion of phosphate rock with concentrated sulfuric acid in a slurry of recycled phosphoric acid. This reaction also generates solid gypsum ($CaSO_4$) particles, which are typically removed by filtration. In subsequent steps the phosphoric acid is clarified and concentrated by thermal evaporation to drive off more than half the water from the crude filtrate.

Flocculants are added to the crude phosphoric acid gypsum slurry to increase particle size, which improves settling and filtration rate. Traditional flocculants used for this application are supplied as a liquid concentrate or dry powder. The dissolution kinetics of traditional powders and the emulsion inversion kinetics of liquid concentrates prevent their direct feed to the crude slurry. A crude phosphoric acid gypsum slurry reaches the filtering stage in tens of seconds to a few minutes after the flocculant feed point, while emulsions and powders require tens of minutes to a few hours for dissolution or inversion. Thus, a concentrate or powder flocculant is diluted with water at the site to yield a working solution (typically containing 0.5% to 1% of the concentrate) that is subsequently fed into the process stream. Traditional flocculant make-down systems consist of a mixing tank to which concentrate or powder is added with water. After sufficient mixing the dilute flocculant is transferred to a storage tank from which the dilute solution is fed to the process. Use of traditional dilute flocculant solution accounts for about 0.5% to 1% of the total volume of water present in the crude phosphoric acid slurry. A typical phosphoric acid production facility will use 5-10 million gallons of water per year for flocculant make-down. After addition, this water must be removed by thermal evaporation in subsequent processing stages requiring use of substantial thermal energy.

Polymer conformation is highly influenced by solution composition. Turro and Arora (J. Phys. Chem. B, Vol. 109 No. 44, 2005, 20714-20718) note that an acrylic acid polymer is tightly coiled at low pH, but raising the pH ionizes the carboxylic acid groups and leads to stretching or swelling of the polymer. The sensitivity of polymer conformation to the presence of dissolved ions is well known, as is the tendency of polymers to bind to the surface of suspended particles. Thus, to ensure that polymers are in a predictable and optimal conformation, traditional polymeric flocculants are made down with raw water rather than low pH process water containing relatively high levels of dissolved solids and suspended particles.

U.S. Pat. No. 4,263,148, to Symens et al., discloses a process for removing colloidal and non-colloidal humic matter from an aqueous solution of phosphoric acid. The process includes the step of treating the phosphoric acid with a flocculant. The disclosure requires that the flocculant first be made down with water to a concentration of 0.1% to 0.5% prior to its further dilution with phosphoric acid to about 0.05% and subsequent addition to the phosphoric acid production process.

In contrast to traditional flocculants, quick inverting flocculant emulsions (e.g., Nalco Pol-EZ) can be added directly to the crude phosphoric acid slurry without the need for dilution. These products offer the advantage of eliminating traditional flocculant dilution water as well as the complicated expensive feed systems that are also associated with traditional flocculants. In some cases, for example, when the required feed point is too near the slurry discharge to the filter, the time is insufficient to allow these emulsions to undergo rapid inversion and adoption of an optimal polymer conformation within the process. As a result, the emulsion may not completely invert or the polymer may be trapped in a poor performing conformation when it binds to the gypsum surface. This results in less than optimal flocculant performance.

Accordingly, there is a need for optimizing the addition of flocculant to the phosphoric acid production process. Desirably, the addition of flocculant will minimize the introduction of water into the phosphoric acid production process. More desirably, the flocculant will be added to the phosphoric acid production process by mixing the flocculant with clarified phosphoric acid that is recycled from the phosphoric acid production process.

SUMMARY OF THE INVENTION

The present invention is directed toward a method of adding an effective amount of a flocculant to a phosphoric acid production process. The method comprises the steps of providing phosphoric acid; injecting the effective amount of flocculant directly into the phosphoric acid; mixing the effective amount of flocculant and the phosphoric acid, which creates a flocculant-acid substance; and introducing the flocculant-acid substance into the phosphoric acid production process.

The present invention is alternately directed toward a method of improving solids separation performance in a phosphoric acid production process. The method comprises the steps of providing phosphoric acid; introducing an effective amount of flocculant directly into the phosphoric acid; mixing the effective amount of flocculant and the phosphoric acid, which creates a flocculant-acid substance; and adding the flocculant-acid substance to the phosphoric acid production process.

The present invention minimizes the introduction of additional water to the phosphoric acid production process by substituting phosphoric acid when making down the flocculant. These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein:

FIG. 1 is a graph that illustrates experimental results for experiments employing Compound A as the flocculant;

FIG. 2 is a graph that illustrates experimental results for experiments employing Compound B as the flocculant;

FIG. 3 is a graph that illustrates experimental results for experiments employing Compound C and Compound D as flocculants; and FIG. 4 is a graph that illustrates experimental results for experiments employing Compound E at two concentrations as the flocculant.

DETAILED DESCRIPTION OF THE INVENTION/PREFERRED EMBODIMENT

Definitions

For purposes of this patent application, the following terms have the definitions set forth below:

"Clarification operation" is any unit operation(s) of a chemical process that decreases the level of cloudiness of a liquid.

"Clarified crude phosphoric acid" is any filtered phosphoric acid (i.e., not digestion slurry) that is not of a quality that is typical of a final product, but that has been treated by a clarification operation.

"Clarified phosphoric acid" is any phosphoric acid that has been treated by a clarification operation, which may include phosphoric acid of a quality that is typical of a final product.

"Crude phosphoric acid" is any filtered phosphoric acid (i.e., not digestion slurry) that is not of a quality that is typical of a final product.

"Digestion slurry" is the product (intermediate or otherwise) of digesting phosphate rock with sulfuric acid. A typical digestion slurry contains solids in a strong acidic solution.

"Directly" is used to describe the addition of a first substance to a second substance without diluting the first substance with water. Flocculants are typically diluted (made down) with raw water prior to their addition to a phosphoric acid digestion slurry. The term "directly" is used to describe such an addition without dilution with raw water.

"Effective amount" means any dosage of any additive that aids desired performance when compared to an untreated control sample.

"Final product" describes a substance or item of a quality such that the substance or item is shipped from a production facility. A final product as related to phosphoric acid is one that has been processed to concentration and clarity specifications that are commonly produced by a phosphoric acid production process and may be shipped to another location for further concentration.

"Flocculant" is a chemical substance that aids filtration or clarification of a liquid by binding to the surface of several small particles to create a larger particle.

"Flocculant-acid substance" is a substance that comprises phosphoric acid and a flocculant.

"Inline blending" is a method of mixing a plurality of substances without using a separate vessel.

"Make down" is the term commonly used to describe the dilution of a flocculant in order to prepare a rapidly active flocculant working solution prior to its addition to a substance.

"Mixing vessel" is anything that is capable of retaining and blending a substance or substances. A mixing vessel may be a tank equipped with an agitator, a tank with a recirculation circuit, or anything else capable of retaining and blending a substance or substances.

"Phosphoric acid production process" is a circuit or series of circuits used for the production of phosphoric acid. A phosphoric acid production process may produce crude phosphoric acid, phosphoric acid of a quality that is typical of a final product, or any other grade or quality of phosphoric acid. A typical phosphoric acid production process includes several interconnected circuits that produce or concentrate phosphoric acid.

"Solids separation operation" is any process of separating solid matter from a fluid.

"Water" and "raw water" are used interchangeably to describe water that contains substantially no phosphoric acid.

While the present invention is susceptible of embodiment in various forms, there is hereinafter described a presently preferred embodiment with the understanding that the present disclosure is to be considered an exemplification of the invention and is not intended to limit the invention to the specific embodiment illustrated.

It should be further understood that the title of this section of this specification, namely, "Detailed Description of the Invention," relates to a requirement of the United States Patent Office, and does not imply, nor should be inferred to limit the subject matter disclosed herein.

The invention relates to the use of crude phosphoric acid, either clarified or unclarified, as a dilution liquid for gypsum flocculants. Flocculants of the invention can be traditional concentrated emulsions or dry polymer products, or they can be quick inverting polymer emulsions. In the case of traditional flocculants, the materials are made down using crude phosphoric acid filtrate as the diluent in place of raw water. In the case of quick inverting polymer emulsions, inline blending of the flocculant with crude phosphoric acid can be used to provide the necessary time for the emulsions to invert and for the polymer to adopt an optimal conformation before introduction to the gypsum slurry. In either case, make-down of flocculants in crude phosphoric acid eliminates the addition of raw water to the phosphoric acid production circuit and allows the manufacturer to produce a higher quantity of final product using the same water and energy resources.

The present invention is directed toward a method of improving filtration and clarification performance in a phosphoric acid production process. The method comprises the steps of providing phosphoric acid; introducing an effective amount of flocculant directly into the phosphoric acid; mixing the effective amount of flocculant and the phosphoric acid, which creates a flocculant-acid substance; and adding the flocculant-acid substance to the phosphoric acid production process.

The present invention is also directed toward a method of adding an effective amount of a flocculant to a phosphoric acid production process. The method comprises the steps of removing crude phosphoric acid from the phosphoric acid production process; injecting the effective amount of flocculant directly into the crude phosphoric acid; mixing the effective amount of flocculant and the crude phosphoric acid, which creates a flocculant-acid substance; and introducing the flocculant-acid substance into the phosphoric acid production process.

For purposes of this patent application, the following table illustrates the various compounds that are discussed.

| Test Products | Composition |
| --- | --- |
| Compound A | 89% Acrylamide and 11% sodium acrylate in a latex copolymer with linear alcohol ethoxylate and orange oil (quick inverting formulation) |
| Compound B | 93% Acrylamide and 7% sodium acrylate in a latex copolymer |
| Compound C | 30% Acrylamide and 70% ammonium acrylate in a latex copolymer |
| Compound D | 25% Acrylamide and 75% ammonium acrylate in a latex copolymer |
| Compound E | 93% Acrylamide and 7% sodium acrylate in a latex copolymer with linear alcohol ethoxylate and orange oil (quick inverting formulation) |

In an effort to minimize the addition of water to the phosphoric acid production process, it has been discovered that crude phosphoric acid can be used as dilution liquid to make down concentrated or dry flocculant polymer products. Such use of crude phosphoric acid requires using pumps, mixers, transfer lines and storage containers compatible with phosphoric acid. Clarified or unclarified crude phosphoric acid filtrate can be used as a dilution fluid.

In an effort to allow time for a flocculant to completely invert, to achieve an optimal conformation prior to application, and to eliminate the addition of undesirable dilution water to the process, it has been discovered that crude phosphoric acid filtrate can be used as a quick inverting flocculant ("QIP" for "quick inverting polymer") diluent. Crude phosphoric acid diluent can be used to provide time for quick inverting polymer activation prior to introduction into the process. Inline blending of a QIP solution into a crude phosphoric acid filtrate stream offers a simple and inexpensive flocculant feed system. With such dilution, soon after the flocculant feed system begins operation, a steady state will be achieved wherein the phosphoric acid content of the crude gypsum slurry filter feed liquid is essentially equivalent to the phosphoric acid content of the crude acid slurry prior to flocculant addition. Virtually no dilution of the crude phosphoric acid will occur with flocculant addition. By comparison, a traditional flocculant feed system accounts for approximately 0.5% to 1.4% of the total volume of the crude phosphoric acid gypsum slurry. Clarified or unclarified crude phosphoric acid filtrate can be used as a dilution fluid.

Using slurry filtration tests, it has been discovered that the performance of some flocculants suffer when crude phosphoric acid diluent is used, while other flocculants exhibit the same or nearly the same performance when diluted with crude phosphoric acid. In a slurry filtration test, a desired amount of a pre-diluted (1% by weight) flocculant solution is added with stirring to 250 mL of freshly collected phosphoric acid digestion slurry containing gypsum solids. The mixture is then stirred for 30 seconds and delivered to a Millipore vacuum (18 psi) filtration apparatus. A timer is started when the slurry enters the filter unit and the time required for the liquid portion of the slurry to pass through the filter wherein the liquid just passes from the edge of the filter cake is recorded as the filtration time. As shown in FIG. 1, quick inverting flocculant formulation Compound A displays a poorer filtration performance profile when pre-diluted in clarified crude phosphoric acid filtrate. However, as illustrated in FIG. 2, Compound B yields approximately the same performance when pre-diluted with clarified crude phosphoric acid filtrate. These results may be due to the crude acid filtrate altering the Compound A polymer conformation in solution relative to raw water, slow Compound A conformation kinetics preventing the formation of the optimal conformation prior to testing and/or the additional polymer demand resulting from the presence of residual gypsum particles present in the clarified crude acid solutions.

Pre-dilution of Compound B with unclarified crude phosphoric acid filtrate reduces filtration performance relative to clarified crude acid, also shown in FIG. 2. This is likely due to presence of residual gypsum particles that are expected to provide polymer binding sites and effectively reduce the concentration of available flocculant. As shown by the trend in filtration time as dosage is increased, adjusting polymer dose compensates for this additional polymer demand and can allow unclarified crude phosphoric acid filtrate to act as an acceptable flocculant dilution liquid.

Phosphoric acid settling tests reveal that Compound C performs well when made down in unclarified 28% phosphoric acid. In a phosphoric acid settling test a freshly collected sample of 44% crude phosphoric acid is dosed with a desired amount of pre-diluted (1% by weight) flocculant in a 1000 mL graduated cylinder. The cylinder is immediately inverted 4 times and a timer started. The rate at which the flocculated gypsum particulates settle is recorded over a period of several minutes. As shown in FIG. 3, Compound C yields approximately the same gypsum settling rate when pre-diluted with 28% unclarified acid as when pre-diluted with water. Compound D, in contrast, displays much slower settling when made down in 28% unclarified phosphoric acid.

Quick inverting flocculant formulation Compound E displays no decrease in digestion slurry filtration performance when pre-diluted with unclarified 28% phosphoric acid, as shown in FIG. 4. As seen in the figure, at 50 ppm and at 100 ppm Compound E yields filtration times that are no slower than when pre-diluted with water.

Due to the higher polymer demand of unclarified phosphoric acid filtrate, clarified crude acid obtained from a later stage of the phosphoric acid production process is a generally more desirable diluent source due to its lower level of suspended solids and corresponding lower polymer demand.

In an embodiment, the present invention may employ crude phosphoric acid, clarified or unclarified.

In an embodiment, the phosphoric acid may be recycled from a single production circuit in a phosphoric acid production process, another circuit within the phosphoric acid production process, an entirely separate phosphoric acid production process, or by other means known to one skilled in the art.

In an embodiment, the flocculant-acid substance may be created and/or mixed via inline blending, mixing in a vessel, or by other means known to one skilled in the art.

In an embodiment, the flocculant-acid substance may be added to the phosphoric acid production process prior to a solids separation operation.

In an embodiment, the flocculant may be an anionic, cationic, amphoteric, or non-ionic polymer.

In an embodiment, the flocculant in this invention may be comprised of a substance selected from the group a vinyl containing functional monomer, a styrene containing functional monomer, an ethylene oxide containing functional monomer, and combinations thereof.

In an embodiment, the flocculant in this invention may be selected from the group copolymers, homopolymers and terpolymers comprising from 0.01 to 100 mole percent of a vinyl-containing functional monomer.

In an embodiment, the flocculant in this invention may be selected from the group copolymers, homopolymers and terpolymers comprising: APTAC (acrylamide propyl trimethyl ammonium chloride), MAPTAC (methacrylamide propyl trimethyl ammonium chloride), DMAEA-MCQ (dimethylaminoethylacrylate methyl chloride quaternary salt), DMAEA-BCQ (dimethylaminoethylacrylate benzyl chloride quaternary salt), DMAEM-MCQ (dimethylaminoethylmethacrylate methyl chloride quaternary salt), DADMAC (diallyldimethylammonium chloride), vinylamine, vinylformamide, ethylenedichloride, and combinations thereof.

In an embodiment, the flocculant may be comprised of a substance selected from the group homopolymers, copolymers, terpolymers comprising: acrylamide, acrylic acid, partially hydrolyzed acrylic acid, partially hydrolyzed acrylamide, 2-acrylamido-2-methylpropanesulfonate, 2-acrylamidoethanesulfonate, styrenesulfonate, ethylene oxide, vinyl alcohol, alkyl hydroxamate, methacrylate, itaconic acid, fumaric acid, crotonic acid, maleic acid, itaconic acid esters, fumaric acid esters, maleic acid esters, alpha-haloacrylic acid, vinylacetic acid, allylacetic acid, beta-carboxyethylacrylate, sulfoalkyl acrylate, sulfoalkyl methacrylate, allylsulfonic acid, methallylsulfonic acid, N-sulfohydrocarbon-substituted acrylamide (e.g. sulfomethylated acrylamide), and combinations thereof. The flocculant may take the form of one or more anionic polymers, as the salt of one or more anionic polymers, as one or more neutral polymers or as one or more cationic polymers. The counterions of the salt of the anionic polymers and the cationic polymers can have a wide range of composition as known to those skilled in the art.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the illustrated specific embodiments or examples is intended or should be inferred. The disclosure is intended to cover by the appended claims all such modifications as fall within the scope of the claims.

We claim:

1. A method of adding flocculant to a phosphoric acid production process which includes providing a gypsum slurry, the method comprising:
    creating a flocculant-acid substance by mixing phosphoric acid and a flocculant emulsion comprising 93 mole percent acrylamide and 7 mole percent sodium acrylate copolymer, thereby inverting the emulsion and causing a change in conformation of the copolymer;
    introducing the flocculant-acid substance into the gypsum slurry of the phosphoric acid production process.

2. The method of claim 1, wherein the phosphoric acid is crude phosphoric acid removed from the phosphoric acid production process.

3. The method of claim 1, wherein the mixing is achieved via at least one of inline blending and mixing in a mixing vessel.

4. The method of claim 1, wherein the copolymer is a quick inverting polymer.

5. A method of improving solids separation performance and minimizing the introduction of additional fresh water in a phosphoric acid production process which includes providing a gypsum slurry, the method comprising:
    introducing a flocculant emulsion comprising a 93 mole percent acrylamide and 7 mole percent sodium acrylate copolymer directly into phosphoric acid;
    mixing the flocculant emulsion and the phosphoric acid, thereby inverting the flocculant emulsion and causing a change in conformation of the copolymer and forming a flocculant-acid substance;
    adding the flocculant-acid substance to a gypsum slurry of the phosphoric acid production process; and
    separating flocculated gypsum from the gypsum slurry;
    wherein the phosphoric acid is clarified crude phosphoric acid recycled from the phosphoric acid production process; and
    wherein the mixing is achieved via inline blending.

6. The method of claim 5, wherein the copolymer is a quick inverting polymer.

7. A method of adding flocculant to a phosphoric acid production process which includes providing a gypsum slurry, the method comprising:
    creating a flocculant-acid substance by inverting a flocculant emulsion comprising a 93 mole percent acrylamide and 7 mole percent sodium acrylate copolymer with phosphoric acid;
    flocculating gypsum in a gypsum slurry of the phosphoric acid production process by combining the flocculant-acid substance and the gypsum slurry of the phosphoric acid production process; and
    separating at least a portion of the flocculated gypsum via a filtration operation.

8. The method of claim 7, wherein the copolymer is a quick inverting polymer.

9. The method of claim 7, wherein the phosphoric acid is crude phosphoric acid removed from the phosphoric acid production process.

10. The method of claim 7, wherein the phosphoric acid is a clarified crude phosphoric acid, the clarified crude phosphoric acid being prepared using phosphoric acid recycled from the phosphoric acid production process.

* * * * *